United States Patent
Yun et al.

(10) Patent No.: US 11,698,034 B2
(45) Date of Patent: Jul. 11, 2023

(54) METHOD OF TRANSIENT CONTROL FOR ROBUST ENRICHMENT OPERATION IN LOW TEMPERATURE COMBUSTION ENGINE

(71) Applicant: GM Global Technology Operations LLC, Detroit, MI (US)

(72) Inventors: Hanho Yun, Oakland Township, MI (US); Jun-mo Kang, Ann Arbor, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 0 days.

(21) Appl. No.: 17/229,418

(22) Filed: Apr. 13, 2021

(65) Prior Publication Data

US 2022/0325671 A1    Oct. 13, 2022

(51) Int. Cl.
*F02D 13/02* (2006.01)
*F02D 41/02* (2006.01)
(Continued)

(52) U.S. Cl.
CPC ..... *F02D 13/0261* (2013.01); *F02D 13/0265* (2013.01); *F02D 41/0235* (2013.01);
(Continued)

(58) Field of Classification Search
CPC .............. F02D 41/006; F02D 41/0235; F02D 41/0261; F02D 41/0265; F02D 41/1475;
(Continued)

(56) References Cited

U.S. PATENT DOCUMENTS 6,047,542 A * 4/2000 Kinugasa ............... F01N 3/2053
60/274
6,109,024 A * 8/2000 Kinugasa ............... F01N 3/0842
60/285

(Continued)

FOREIGN PATENT DOCUMENTS

| JP | 2003184606 A | * | 7/2003 | ......... F02D 41/3035 |
| JP | 2003343313 A | * | 12/2003 | ............ F02B 75/048 |
| JP | 2009191659 A | * | 8/2009 | ......... F02D 41/3035 |

OTHER PUBLICATIONS

U.S. Appl. No. 17/176,277, filed Feb. 16, 2021.

*Primary Examiner* — John M Zaleskas
(74) *Attorney, Agent, or Firm* — Vivacqua Crane, PLLC

(57) ABSTRACT

A method of transient control for enrichment operation in a low-temperature combustion engine. The method includes determining if a current mode of the low-temperature combustion (LTC) engine is a positive valve overlap (PVO) mode. Determining if a previous mode of the LTC engine was also the PVO mode when the current mode is the PVO mode, wherein the previous mode is immediately prior to the current mode. Determining if the previous mode of the LTC engine was a negative valve overlap (NVO) mode when the previous mode was not the PVO mode. Initiating a predetermined enrichment PVO mode for the LTC engine based on the previous mode of the LTC engine. The predetermined enrichment PVO mode includes initiating a deep enrichment PVO mode, when the previous mode of the LTC engine was the NVO mode, and initiating a shallow enrichment PVO mode, when the previous mode of the LTC engine was not the NVO mode.

20 Claims, 4 Drawing Sheets

(51) Int. Cl.
*F02D 41/14* (2006.01)
*F02D 41/30* (2006.01)
(52) U.S. Cl.
CPC ..... *F02D 41/1475* (2013.01); *F02D 41/3017* (2013.01); *F02D 41/3035* (2013.01); *F02D 2041/1468* (2013.01); *F02D 2200/08* (2013.01); *F02D 2200/1002* (2013.01)
(58) Field of Classification Search
CPC ............. F02D 41/3035; F02D 41/3041; F02D 41/3064; F02D 2041/001
See application file for complete search history.

(56) References Cited

U.S. PATENT DOCUMENTS

| | | | | |
|---|---|---|---|---|
| 2006/0196467 A1* | 9/2006 | Kang | ................... | F02D 9/02 123/305 |
| 2006/0196468 A1* | 9/2006 | Chang | ................ | F02D 41/3064 123/305 |
| 2006/0243241 A1* | 11/2006 | Kuo | ..................... | F02D 35/028 123/295 |
| 2008/0302319 A1* | 12/2008 | Kang | ................. | F02D 41/3064 123/90.15 |
| 2010/0107605 A1* | 5/2010 | Brinkman | .......... | B01D 53/9477 60/274 |
| 2010/0107606 A1* | 5/2010 | Narayanaswamy | ........................ | F01N 13/0093 60/274 |
| 2010/0162991 A1* | 7/2010 | Ramappan | ................ | F02B 1/02 123/27 R |
| 2010/0204903 A1* | 8/2010 | Nakatani | ............. | F02D 13/0265 701/103 |
| 2010/0212295 A1* | 8/2010 | Narayanaswamy | ........................ | F02D 41/0235 60/285 |
| 2011/0168130 A1* | 7/2011 | Kang | ................. | F02D 41/0062 123/295 |
| 2011/0283971 A1* | 11/2011 | Wermuth | ................ | F02P 5/045 123/406.11 |
| 2011/0283972 A1* | 11/2011 | Wermuth | ............ | F02D 41/3035 123/406.12 |
| 2011/0288750 A1* | 11/2011 | Wermuth | ............ | F02D 41/3064 701/105 |
| 2011/0295487 A1* | 12/2011 | Ramappan | ................ | F02B 1/12 701/103 |
| 2013/0018565 A1* | 1/2013 | Yun | ..................... | F02D 41/3035 701/102 |
| 2013/0042597 A1* | 2/2013 | Gonze | ..................... | F01N 3/103 60/274 |
| 2013/0174805 A1* | 7/2013 | Bayer | ................. | F02D 41/3064 123/295 |
| 2013/0269317 A1* | 10/2013 | Narayanaswamy | ........................ | F02D 41/0082 60/274 |
| 2014/0069382 A1* | 3/2014 | Iwai | ........................ | F02D 41/18 123/406.47 |
| 2014/0157760 A1* | 6/2014 | Tufail | ................. | F02D 41/0275 60/274 |
| 2014/0283784 A1* | 9/2014 | Takahashi | ............ | F02D 13/0265 123/350 |
| 2014/0283785 A1* | 9/2014 | Takahashi | ............ | F02D 41/3011 123/350 |
| 2015/0083073 A1* | 3/2015 | Nagatsu | ................. | F02D 41/123 123/294 |
| 2015/0114342 A1* | 4/2015 | Iwai | ........................ | F02D 21/08 123/305 |
| 2015/0226143 A1* | 8/2015 | Iwai | .................... | F02D 41/3035 123/294 |
| 2017/0226938 A1* | 8/2017 | Kemmerling | ............ | F01N 3/106 |
| 2017/0321613 A1* | 11/2017 | Yun | ............................. | F01L 1/34 |
| 2017/0363020 A1* | 12/2017 | Okada | ................. | F02D 13/0219 |
| 2019/0003442 A1* | 1/2019 | Ortiz-Soto | ............ | F01N 13/011 |
| 2019/0145367 A1* | 5/2019 | Tanaka | ................ | F02D 41/0057 123/470 |
| 2019/0360450 A1* | 11/2019 | Sueoka | .................. | F02D 13/0207 |
| 2020/0141377 A1* | 5/2020 | Inoue | ..................... | F02D 21/08 |
| 2021/0285360 A1* | 9/2021 | Shmueli | .................... | F02B 3/06 |
| 2022/0154663 A1* | 5/2022 | Kaminaga | ............ | F02D 41/0002 |
| 2022/0154664 A1* | 5/2022 | Kaminaga | ............. | F02D 35/026 |
| 2022/0260030 A1* | 8/2022 | Yun | ..................... | F02D 41/0002 |

\* cited by examiner

METHOD OF TRANSIENT CONTROL FOR ROBUST ENRICHMENT OPERATION IN LOW TEMPERATURE COMBUSTION ENGINE

GOVERNMENT CLAUSE

This invention was made with government support under Grant No. DE-EE0007788 awarded by the U.S. Department of Energy. The Government has certain rights in this invention.

INTRODUCTION

The present disclosure relates to methods of controlling low-temperature combustion (LTC) engines, more particularly to a method of transient control for robust enrichment operation in LTC engines.

Low temperature combustion (LTC) is an engine technology that is used in modern vehicles to reduce the oxides of nitrogen (NOx) and soot emissions from the vehicles' tailpipes while simultaneously maintaining higher thermal efficiency. LTC engines are configured to operate in one or more of the following compression ignition (CI) modes: spark ignition (SI) mode, homogeneous charge compression ignition (HCCI) mode, premixed charge compression ignition (PCCI) mode, and reactivity controlled compression ignition (RCCI) mode. The valve timing of the LTC engine is adjustable to yield a positive valve overlap (PVO) or a negative valve overlap (NVO) when the LTC engine operates in any of the above modes CI modes.

Three-way and selective catalytic reduction (SCR) catalysts are known to be used with LTC engines to further reduce emissions in the exhaust from the LTC engines. When an air/fuel ratio of an LTC engine is rich or stoichiometric, the three-way catalyst reduces hydrocarbon, carbon monoxide, and nitrogen oxide and produces ammonia, and the SCR catalyst stores the ammonia. When the air/fuel ratio is lean, the three-way catalyst reduces hydrocarbon and carbon monoxide, and the ammonia stored in the SCR catalyst is used to reduce nitrogen oxide.

Thus, while LTC engines paired with a 3-way and SCR catalysts achieve their intended purpose, there is a continued need for further improvements in the reductions of particulate and greenhouse gas emissions from the tail-pipes of motor vehicles while maintaining or improving fuel economy gains.

SUMMARY

A method of transient control for enrichment operation in a low-temperature combustion engine is disclosed. The method includes the steps of determining if a current mode of the low-temperature combustion (LTC) engine is a positive valve overlap (PVO) mode; determining if a previous mode of the LTC engine was the PVO mode when the current mode is the PVO mode; determining if the previous mode of the LTC engine was a negative valve overlap (NVO) mode when the previous mode was not the PVO mode; and initiating a predetermined enrichment PVO mode for the LTC engine based on whether the previous mode of the LTC engine was the NVO mode.

In an additional aspect of the present disclosure, wherein initiating the predetermined enrichment PVO mode includes initiating a deep enrichment PVO mode, when the previous mode of the LTC engine was the NVO mode.

In another aspect of the present disclosure, wherein initiating the predetermined enrichment PVO mode includes initiating a shallow enrichment PVO mode, when the previous mode of the LTC engine was not the NVO mode.

In another aspect of the present disclosure, the method further includes the steps of determining if the LTC engine is currently operating in a shallow enrichment PVO mode, when the previous mode was the PVO mode; determining if the shallow enrichment PVO mode is expired, when the LTC engine is currently operating in the shallow enrichment PVO mode; and initiating a lean PVO mode for the LTC engine when the shallow enrichment PVO mode is expired.

In another aspect of the present disclosure, the method further includes the steps of determining if a torque output of the LTC engine is below a predetermined threshold when the shallow enrichment PVO mode has not expired; determining an amount of $NH_3$ in a SCR is above a predetermined amount when the torque output of the LTC engine is below the predetermined threshold; and initiating the lean PVO mode for the LTC engine when the amount of $NH_3$ in the SCR is at or above the predetermined amount.

In another aspect of the present disclosure, the method further includes the steps of initiating a deep enrichment PVO mode when the amount of $NH_3$ in the SCR is below the predetermined amount.

In another aspect of the present disclosure, the method further includes the steps of determining if the LTC engine is currently operating in a deep enrichment PVO mode, when the LTC engine is not currently operating in a shallow enrichment PVO mode; determining if the deep enrichment PVO mode is expired, when the LTC engine is currently operating in the deep enrichment PVO mode; and initiating a lean PVO mode for the LTC engine when the deep enrichment PVO mode is expired.

In another aspect of the present disclosure, wherein the deep enrichment PVO mode includes an air/fuel ratio of between about 11:1 to about 12:1.

In another aspect of the present disclosure, wherein the shallow enrichment PVO mode includes an air/fuel ratio of between about 13:1 to about 14:1.

In another aspect of the present disclosure, wherein the deep enrichment PVO mode includes an air/fuel ratio of about 12:1 and the shallow enrichment PVO mode includes an air/fuel ratio of about 13:1.

According to several aspects, a method of transient control for enrichment operation in a low-temperature combustion engine is disclosed. The method includes determining if a current mode of the low-temperature combustion (LTC) engine is a positive valve overlap (PVO) mode; determining if a previous mode of the LTC engine was the PVO mode wherein the previous mode is immediately prior to the current mode; determining if the previous mode of the LTC engine was a negative valve overlap (NVO) mode when the previous mode was not the PVO mode; initiating a deep enrichment PVO mode when the previous mode of the LTC engine was the NVO mode; and initiating a shallow enrichment PVO mode when the previous mode of the LTC engine was not the NVO mode.

In an additional aspect of the present disclosure, the method further includes determining when the LTC engine is currently operating in one of a shallow enrichment PVO mode and a deep enrichment PVO mode, when the previous mode was the PVO mode; and initiating a lean PVO mode for the LTC engine, when the one of: the shallow enrichment PVO mode and the deep enrichment PVO mode is expired.

In another aspect of the present disclosure, the method further includes determining if a torque output of the LTC engine is below a predetermined threshold when the LTC engine is currently operating in one of: a shallow enrichment PVO mode and the shallow enrichment PVO mode has not expired; determining an amount of $NH_3$ in a SCR is above a predetermined amount when the torque output of the LTC engine is below the predetermined threshold; and initiating the lean PVO mode for the LTC engine, when the amount of $NH_3$ in the SCR is at or above the predetermined amount.

In another aspect of the present disclosure, wherein the deep enrichment PVO mode includes a lower air/fuel ratio than the shallow enrichment PVO mode.

In another aspect of the present disclosure, wherein the deep enrichment PVO mode includes an air/fuel ratio of between about 11:1 to about 12:1 and the shallow enrichment PVO mode includes an air/fuel ratio of between about 13:1 to about 14:1

According to several aspects, a method of transient control for enrichment operation in a low-temperature combustion (LTC) engine. The method includes detecting a change in a combustion mode of the LTC engine; determining if the change in the combustion mode is to a positive valve overlap (PVO) mode; determining a previous mode, when the change in the combustion mode is to a PVO; and initiating a predetermined enrichment PVO mode based on the previous mode.

In an additional aspect of the present disclosure, wherein the previous mode is one of a stoichiometric spark ignition (SI) mode and a negative valve overlap (NVO) mode.

In another aspect of the present disclosure, wherein initiating a predetermined enrichment PVO mode includes initiating a shallow enrichment PVO mode when the previous mode is the SI mode.

In another aspect of the present disclosure, wherein initiating a predetermined enrichment PVO mode includes initiating a deep enrichment PVO when the previous mode is the NVO mode.

In another aspect of the present disclosure, the method further includes initiating a lean PVO mode when the predetermined enrichment PVO mode is expired, wherein the predetermined enrichment PVO mode includes one of: a shallow enrichment PVO mode and a deep enrichment PVO mode.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. The illustrated embodiments are disclosed with reference to the drawings, wherein like numerals indicate corresponding parts throughout the several drawings. The figures are not necessarily to scale and some features may be exaggerated or minimized to show details of particular features. The specific structural and functional details disclosed are not intended to be interpreted as limiting, but as a representative basis for teaching one skilled in the art as to how to practice the disclosed concepts.

As used herein, the term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip. The term code, as used above, may include software, firmware, and/or microcode, and may refer to programs, routines, functions, classes, data structures, and/or objects.

Figure 1:
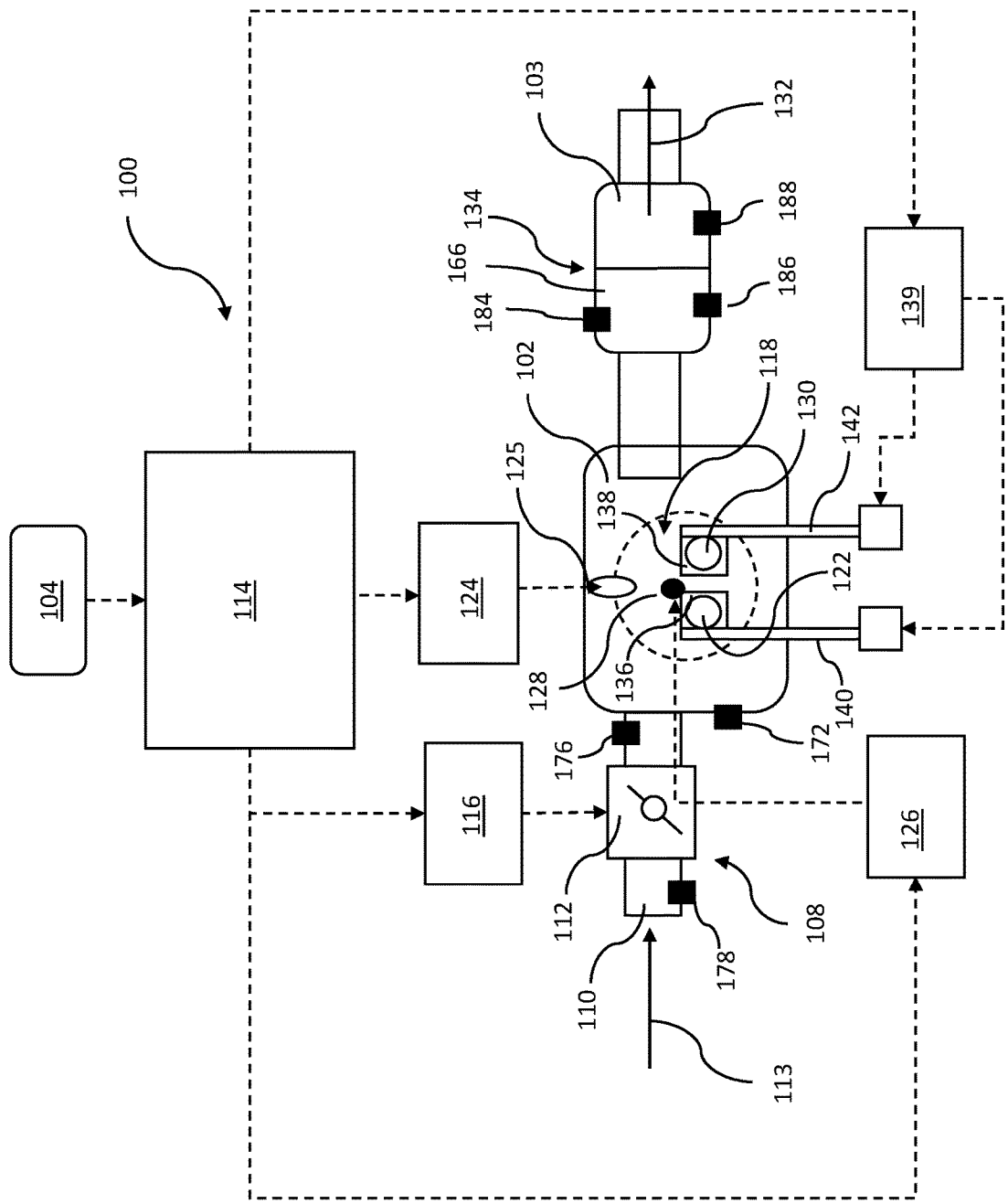
FIG. 1 is a functional block diagram of an example engine system according to the principles of the present disclosure.

Shown in FIG. 1 is an engine system 100 having a low-temperature combustion (LTC) engine 102 coupled to a three-way and selective catalytic reduction (SCR) catalysts incorporated in the exhaust system 134 of the LTC engine 102. The LTC engine 102 is configured to operate in one or more of the following modes: spark ignition (SI) mode, homogeneous charge compression ignition (HCCI) mode, premixed charge compression ignition (PCCI) mode, and reactivity controlled compression ignition (RCCI) mode. When an LTC engine 102 operates in any of the above compression ignition (CI) modes, the valve timing of the LTC engine 102 is adjustable to yield a positive valve overlap (PVO) or a negative valve overlap (NVO).

The LTC engine 102 generates a drive torque for to propel a vehicle (not shown) by combusting a mixture of air/fuel ratio by mass (A/F ratio). The amount of drive torque produced by the LTC engine 102 is based on a driver torque request (i.e., a driver-demanded torque) from a torque request module 104. The torque request module 104 may generate the driver torque request based on a position of an accelerator pedal and/or a speed setting of a cruise control system (not shown). Air is drawn into the LTC engine 102 through an intake system 108. The intake system 108 includes an intake manifold 110 and a throttle valve 112. The throttle valve 112 may include a butterfly valve having a rotatable blade. An engine control module (ECM) 114 controls a throttle actuator module 116, which regulates opening of the throttle valve 112 to control the amount of air 113 drawn into the intake manifold 110. Air 113 from the intake manifold 110 is drawn into a cylinder 118 of the LTC engine 102. While the LTC engine 102 may include multiple cylinders, a single representative cylinder 118 is shown for illustration purposes.

In the embodiment shown, the LTC engine 102 is configured to use a four-stroke engine cycle. The four strokes, described below, are named the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates fuel injections performed by a fuel injector 125 to achieve a desired A/F ratio. Fuel may be injected into the intake manifold 110 at a central location or at multiple locations, such as near the intake valve 122 of each cylinder. In various implementations, fuel may be injected directly into the cylinder 118 or into mixing chambers associated with the cylinders.

The injected fuel mixes with air and creates a combustible A/F mixture in the cylinder 118. During the compression stroke, a piston (not shown) within the cylinder 118 compresses the A/F mixture. The LTC engine 102 is configured to combust the A/F mixture in one or more of the following combustion ignition (CI) modes: spark ignition (SI), homogeneous charge compression ignition (HCCI), premixed charge compression ignition (PCCI), and reactivity controlled compression ignition (RCCI). When the LTC engine 102 is operating in the SI mode, a spark actuator module 126 energizes a spark plug 128 to generate a spark in the cylinder 118 based on a signal from the ECM 114, which ignites the A/F mixture. The timing of the spark may be specified relative to the time when the piston is at its top-most position, referred to as top dead center (TDC).

When the LTC engine 102 is operating in any of the compression ignition modes, compression in the cylinder 118 ignites the A/F mixture. The LTC engine 102 may operate in a spark-assist mode in conjunction with any of the compression ignition modes. When the LTC engine 102 is operating in the spark-assist mode, after combustion is initiated by compression in the cylinder 118, the spark actuator module 126 energizes the spark plug 128 to generate a spark in the cylinder 118 to ensure that the entire A/F mixture is combusted. The spark actuator module 126 may be controlled by a spark timing signal specifying how far before or after TDC to generate the spark. Because piston position is directly related to crankshaft rotation, operation of the spark actuator module 126 may be synchronized with crankshaft angle.

During the combustion stroke, combustion of the A/F mixture drives the piston down, thereby driving the crankshaft. The combustion stroke may be defined as the time between the piston reaching TDC and the time at which the piston returns to bottom dead center (BDC). During the exhaust stroke, the piston begins moving up from BDC and expels the byproducts of combustion through an exhaust valve 130. The byproducts of combustion are exhausted from the vehicle via an exhaust system 134.

The intake valve 122 is actuated using an intake valve actuator 136, while the exhaust valve 130 is actuated using an exhaust valve actuator 138. A valve actuator module 139 may control the intake and exhaust valve actuators 136 and 138 based on signals from the ECM 114. In various implementations, the intake valve actuator 136 may actuate multiple intake valves (including the intake valve 122) of the cylinder 118. Similarly, the exhaust valve actuator 138 may actuate multiple exhaust valves (including the exhaust valve 130) of the cylinder 118. Additionally, a single valve actuator may actuate one or more exhaust valves of the cylinder 118 and one or more intake valves of the cylinder 118. Further, the intake valve actuator 136 may actuate multiple intake valves of multiple cylinders, and the exhaust valve actuator 138 may actuate multiple exhaust valves of multiple cylinders.

In various implementations, the intake valve actuator 136 may be driven by an intake camshaft 140, and the exhaust valve actuator 138 may be driven by an exhaust camshaft 142. For example, the intake valve actuator 136 may include a rocker arm and a cam follower coupled to the rocker arm. The rocker arm may lift the intake valve 122 from its valve seat when the cam follower engages a lobe on the intake camshaft 140. Similarly, the exhaust valve actuator 138 may include a rocker arm and a cam follower coupled to the rocker arm. The rocker arm may lift the exhaust valve 130 from its valve seat when the cam follower engages a lobe on the exhaust camshaft 142.

In other implementations, the intake and exhaust valve actuators 136 and 138 may actuate the intake and exhaust valves 122 and 130 independent of a camshaft. For example, the intake and exhaust valves 122 and 130 may be electromagnetic or electrohydraulic valve actuators. In these implementations, the intake and exhaust valve actuators 136 and 138 may be referred to as cam-less valve actuators.

When the LTC engine 102 operates in a positive valve overlap (PVO) mode, the valve actuators 136 and 138 adjust the timing of the intake and exhaust valves 122 and 130 to yield a positive valve overlap. A positive valve overlap occurs when the opening periods of the intake and exhaust valves 122 and 130 overlap one another. When the LTC engine 102 operates in a negative valve overlap (NVO) mode, the valve actuators 136 and 138 adjust the timing of the intake and exhaust valves 122 and 130 to yield a negative valve overlap. A negative valve overlap occurs when the opening periods of the intake and exhaust valves 122 and 130 do not overlap.

The exhaust system 134 includes a three-way catalyst 166 and a selective catalytic reduction (SCR) catalyst 103. When the A/F ratio of the LTC engine 102 is rich or stoichiometric, the three-way catalyst 166 reduces hydrocarbon, carbon monoxide, and nitrogen oxide and produces ammonia, and the SCR catalyst 103 stores the ammonia. When the A/F ratio is lean, the three-way catalyst 166 reduces hydrocarbon and carbon monoxide, and the ammonia stored in the SCR catalyst 103 is used to reduce nitrogen oxide.

Various sensors such as a crankshaft position (CKP) sensor 172, a manifold absolute pressure (MAP) sensor 176, a mass air flow (MAF) sensor 178, an A/F ratio (AFR) sensor 184, a nitrogen oxide (NOx) sensor 186, exhaust gas temperature (EGT) sensors 188, and other sensors may be incorporated into the engine system 100 to gather information for the ECM 114 to manage and operate the engine system 100.

For measuring and gathering data related to the LTC engine 102, the position of the crankshaft may be measured using the crankshaft position (CKP) sensor 172. The pressure within the intake manifold 110 may be measured using the manifold absolute pressure (MAP) sensor 176. In various implementations, engine vacuum, which is the difference between ambient air pressure and the pressure within the intake manifold 110, may be measured. The mass flow rate of air flowing into the intake manifold 110 may be measured using the mass air flow (MAF) sensor 178. In various implementations, the MAF sensor 178 may be located in a housing that also includes the throttle valve 112.

For measuring and gathering data related to the exhaust system, and A/F ratio of exhaust gas from the LTC engine 102 may be measured using the A/F ratio (AFR) sensor 184. Nitrogen oxide and ammonia levels (or concentrations) in exhaust gas from the LTC engine 102 may be measured using the nitrogen oxide (NOx) sensor 186. The AFR sensor 184 and the NOx sensor 186 may be positioned at or near the outlet of the three-way catalyst 166. The temperature of exhaust gas from the LTC engine 102 may be measured using the exhaust gas temperature (EGT) sensors 188. The EGT sensor 188 may be disposed at or near the inlet of the SCR catalyst 103.

Figure 2:
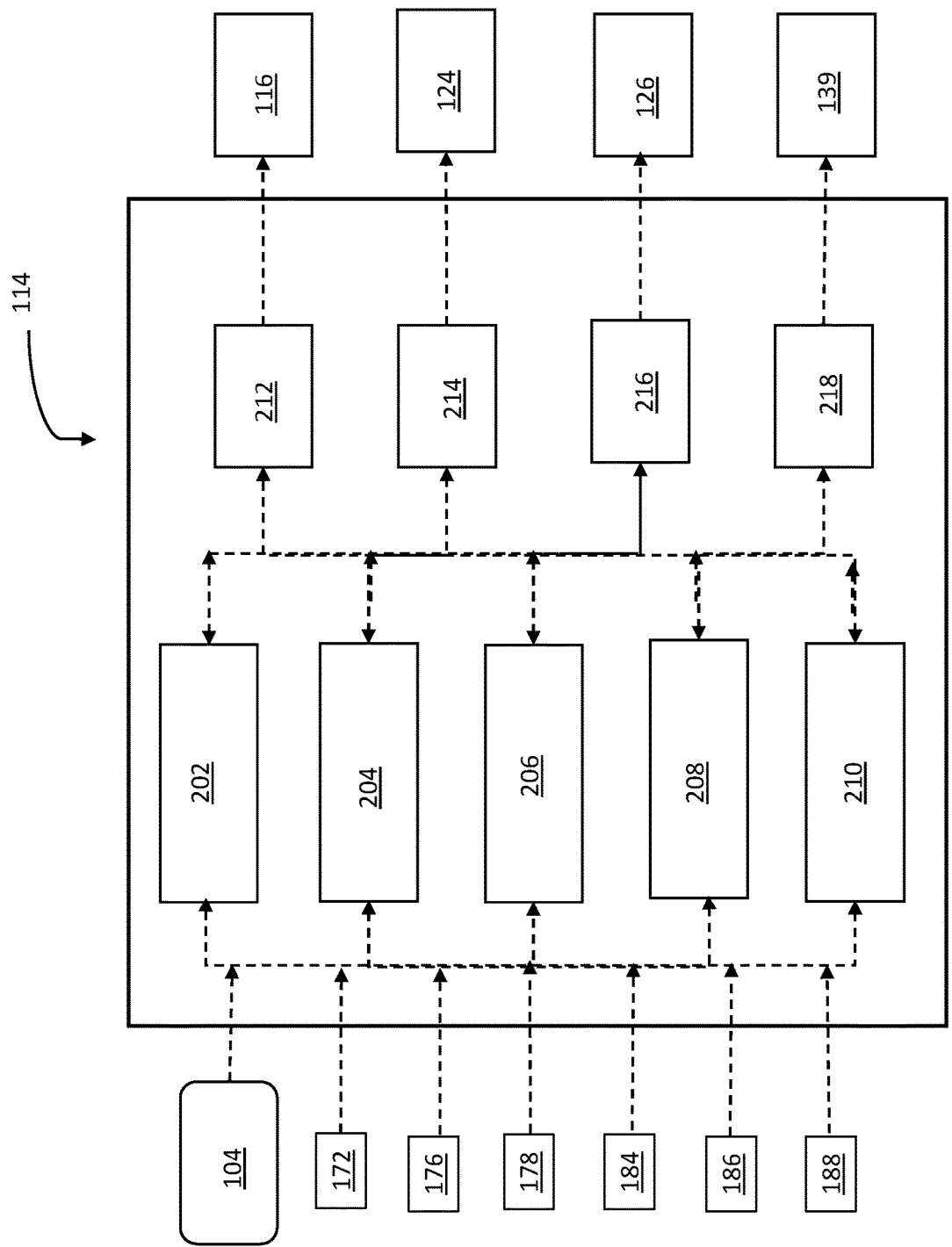
FIG. 2 is a functional block diagram of an example engine control system according to the principles of the present disclosure.

Shown in FIG. 2 is an example of an implementation of the ECM 114 having an engine speed module 202, a desired MAP module 204, an ammonia storage level module 206, a combustion mode module 208, and an A/F ratio control module 210. The ECM 114 uses signals from one or more of the sensors 172, 176, 178, 184, 186, 188 and distributes the signals to the appropriate control decision modules 202, 204, 206, 208, 210 to make control decisions for the engine system 100. The exemplary ECM 114 further includes a throttle control module 212, a fuel control module 214, a spark control module 216, and a valve control module 218 for implementing the control decisions from the modules 202, 204, 206, 208, and 210. Each of the control decision modules 202, 204, 206, 208, and 210 may be in communication with one another and with one or more of the implementation modules 212, 214, 216, and 218. Any signals received by received by and control decisions made by the control decision modules 202, 204, 206, 208, and 210 may be referred to as signals received by and control decisions made by the ECM 114. Furthermore, any control decisions implemented by the implementation modules 212, 214, 216, or 218 may be referred to as control decisions implemented by the ECM 114.

The engine speed module 202 determines the speed of the LTC engine 102 based on the crankshaft position from the CKP sensor 172. For example, the engine speed module 202 may calculate the engine speed based on a period that elapses as the crankshaft completes one or more revolutions. The engine speed module 202 outputs the engine speed.

The desired MAP module 204 determines a desired MAP of the LTC engine 102. The desired MAP module 204 may set the desired MAP of the LTC engine 102 to a predetermined value. Additionally or alternatively, the desired MAP module 204 may determine the desired MAP of the LTC engine 102 based on one or more operating conditions of the LTC engine 102 such as the speed of the LTC engine 102 and/or the load on the LTC engine 102. The engine load is equal to the driver torque request. The desired MAP module 204 outputs the desired MAP of the LTC engine 102.

The ammonia storage level module 206 estimates a storage level of ammonia in the SCR catalyst 103. The ammonia storage level module 206 may estimate the ammonia storage level based on a mass flow rate of ammonia entering the SCR catalyst 103, a mass flow rate of nitrogen oxide entering the SCR catalyst 103, and a temperature of exhaust gas entering the SCR catalyst 103. For example, the ammonia storage level module 206 may estimate the ammonia storage level based on the ammonia flow rate, the nitrogen oxide flow rate, and the exhaust gas temperature using a mathematical model or a lookup table. The ammonia storage level module 206 receives the exhaust gas temperature from the EGT sensor 188. The ammonia storage level module 206 outputs the ammonia storage level.

The ammonia storage level module 206 may determine the ammonia flow rate based on the level of ammonia entering the SCR catalyst 103 and the mass flow rate of exhaust gas entering the SCR catalyst 103. For example, the ammonia storage level module 206 may determine a product of the ammonia level and the exhaust gas flow rate to obtain the ammonia flow rate. The ammonia storage level module 206 may determine the nitrogen oxide flow rate based on the level of nitrogen oxide entering the SCR catalyst 103 and the mass flow rate of exhaust gas entering the SCR catalyst 103. For example, the ammonia storage level module 206 may determine a product of the nitrogen oxide level and the exhaust gas flow rate to obtain the nitrogen oxide flow rate.

When the A/F ratio of the LTC engine 102 is lean, the ammonia storage level module 206 may set the ammonia level to zero and determine the nitrogen oxide level based on an input from the NOx sensor 186. When the A/F ratio of the LTC engine 102 is rich or stoichiometric, the ammonia storage level module 206 may set the nitrogen oxide level to zero and determine the ammonia level based on the input from the NOx sensor 186. The ammonia storage level module 206 receives the A/F ratio of the LTC engine 102 from the AFR sensor 184. The ammonia storage level module 206 may use the mass flow rate of intake air from the MAF sensor 178 as an approximation of the exhaust gas flow rate.

The combustion mode module 208 switches the combustion mode of the LTC engine 102 between the SI mode, the PVO mode, and the NVO mode. In one example, the combustion mode module 208 switches the combustion mode of the LTC engine 102 between the SI mode, the PVO mode, and the NVO mode based on a predetermined engine speed and/or the engine load. The combustion mode module 208 may also adjust the combustion mode of the LTC engine 102 to the HCCI mode, the PCCI mode, and the RCCI mode. The combustion mode module 208 may adjust the LTC engine 102 to more than combustion mode. For example, the combustion mode module 208 may adjust the LTC engine 102 to the PVO mode or the NVO mode and to the HCCI mode, the PCCI mode, or the RCCI mode. In turn, the LTC engine 102 may operate in the PVO mode or the NVO mode while also operating in the HCCI mode, the PCCI mode, or the RCCI mode. The combustion mode module 208 outputs the combustion mode(s) of the LTC engine 102.

The A/F ratio control module 210 controls the A/F ratio of the LTC engine 102 (i.e., the A/F ratio of the A/F mixture combusted by the LTC engine 102) by outputting a desired A/F ratio of the LTC engine 102. The A/F ratio control module 210 may switch the desired A/F ratio between a rich A/F ratio (e.g., an A/F ratio between 9:1 and 13:1), a lean A/F ratio (e.g., an A/F ratio between 18:1 and 25:1), and a stoichiometric A/F ratio (e.g., an A/F ratio of 14.7:1). The A/F ratio control module 210 may adjust the desired A/F ratio of the LTC engine 102 to the rich A/F ratio or the lean A/F ratio when the LTC engine 102 is operating in the PVO mode. The A/F ratio control module 210 may adjust the desired A/F ratio of the LTC engine 102 to the lean A/F ratio when the LTC engine 102 is operating in the NVO mode. The A/F ratio control module 210 may adjust the desired A/F ratio of the LTC engine 102 to the stoichiometric A/F ratio when the LTC engine 102 is operating in the SI mode.

The throttle control module 212 outputs a desired position of the throttle valve 112 to the throttle actuator module 116, which in turn actuates the throttle valve 112 to decrease the difference between the actual position of the throttle valve 112 and the desired position. The throttle control module 212 may adjust the position of the throttle valve 112 based on the desired MAP. For example, the throttle control module 212 may adjust the position of the throttle valve 112 to reduce the difference between the actual MAP and the desired MAP. The throttle control module 212 may receive the actual MAP from the MAP sensor 176. The throttle control module 212 may receive the desired MAP from the A/F ratio control module 210.

The fuel control module 214 controls the amount(s) of fuel injected by the fuel injectors of the LTC engine 102 (including the fuel injector 125) during each engine cycle. In one example, the fuel control module 214 controls the total mass of all fuel injections for each cylinder during each engine cycle, as well as a fuel split ratio for each cylinder. The fuel split ratio is a ratio between a mass of a pilot fuel injection for a cylinder during an engine cycle and the total mass of all fuel injections for the cylinder during the engine cycle. The fuel control module 214 also controls the timing of the fuel injections. The timing of the fuel injections may be specified relative to the time when the piston is at its topmost position, referred to as top dead center (TDC).

The fuel control module 214 may control the total mass of all fuel injections for each cylinder during each engine cycle to achieve the desired A/F ratio (i.e., decrease the difference between the actual A/F ratio measured by the AFR sensor 184 and the desired A/F ratio). The fuel control module 214 may receive the actual A/F ratio from the A/F ratio control module 210. The fuel control module 214 outputs a signal indicating the total mass of fuel injections for each cylinder during each engine cycle, the split ratio of each cylinder, and the fuel injection timing. In response, the fuel actuator module 124 actuates the fuel injectors of the LTC engine 102 to achieve the total mass of fuel injections, the split ratio, and the fuel injection timing.

The spark control module 216 controls the spark plugs of the LTC engine 102 (including the spark plug 128) to generate a spark in cylinders of the LTC engine 102. The spark control module 216 outputs a signal indicating the spark timing for each cylinder of the LTC engine 102, and the spark actuator module 126 actuates the spark plugs of the LTC engine 102 to achieve the spark timing. When the LTC engine 102 is operating in the SI mode, the spark control module 216 adjusts the spark timing so that combustion in the cylinders of the LTC engine 102 is initiated by the spark. When the LTC engine 102 is operating in the spark-assist mode, the spark control module 216 adjusts the spark timing so that spark is generated in a cylinder after combustion is initiated (or expected to be initiated) by compression within the cylinder.

The valve control module 218 controls the lift (opening amount), opening duration, and opening timing of the intake and exhaust valves of the LTC engine 102 (including the intake and exhaust valves 122 and 130). The valve control module 218 outputs a signal indicating a desired lift, a desired opening duration, and a desired timing of each of the intake and exhaust valves of the LTC engine 102. In response, the valve actuator module 139 controls the intake and exhaust valves to achieve the desired valve lift, the desired valve opening duration, and the desired valve timing. When the LTC engine 102 operates in the PVO mode, the valve control module 218 adjusts the timing of the intake and exhaust valves of the LTC engine 102 to yield a positive valve overlap. When the LTC engine 102 operates in the NVO mode, the valve control module 218 adjusts the timing of the intake and exhaust valves of the LTC engine 102 to yield a negative valve overlap.

Figure 3:
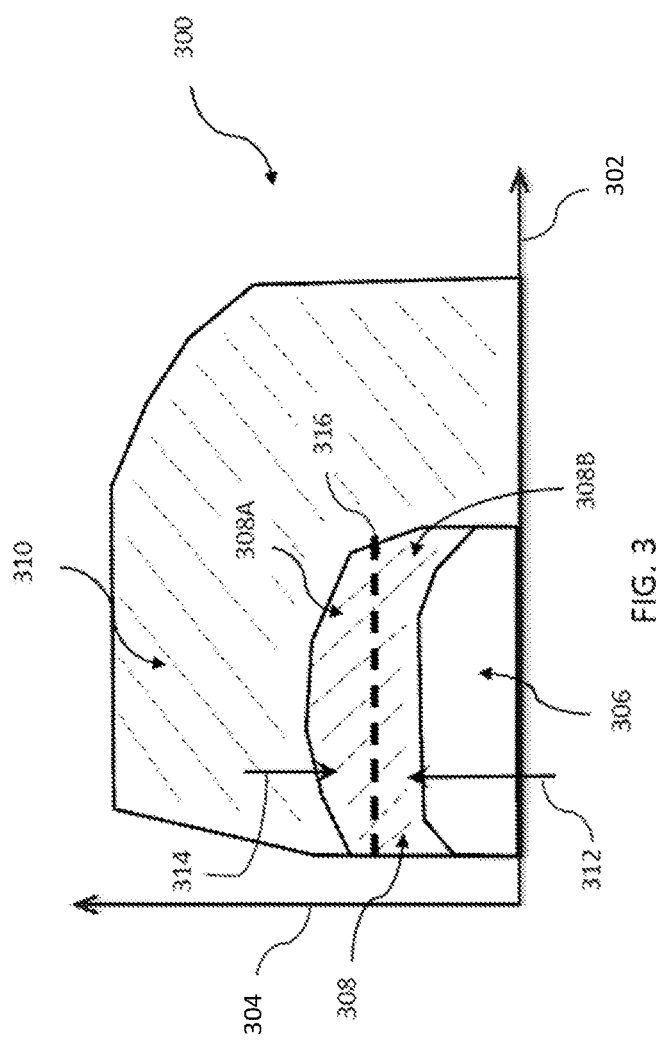
FIG. 3 is a graph illustrating an example relationship between engine operating conditions and a positive valve overlap (PVO) mode, a negative valve overlap (NVO) mode, and a spark ignition (SI) mode according to the present disclosure.

Shown in FIG. 3 a graph 300 illustrates an example of operating modes of the LTC engine 102. The x-axis 302 represents engine speed in revolution per minute (rpm) and the y-axis 304 that represents engine load (or driver demanded torque) in Newton-meters (Nm). The graph 300 presents three operating ranges, or modes, of the LTC engine 102 plotted with respect to an x-axis 302 and a y-axis 304.

The three operating ranges includes a NVO mode operating range 306, a PVO mode operating range 308, and an SI mode operating range 310.

The LTC engine 102 may transition from one operating range to another operating range in order to accommodate a request by an operator for a change in torque output generated by the LTC engine 102. The operator may request a demand for an output torque increase by pressing down on an accelerator pedal, which is referred to as an accelerator pedal tip-in, or a demand for an output torque decrease by releasing the accelerator pedal, which is referred to as an accelerator pedal tip-out. In an exemplary operating scenario, in response to an accelerator pedal tip-in 312, the LTC engine 102 transitions from the NVO mode 306 to the PVO mode 308. In response to an accelerator pedal tip-out 314, the LTC engine 102 transitions from the SI mode 310 to the PVO mode 308.

The graph 300 shows a dash boundary line 316 that partitions the lean PVO mode operating range 308 into a first PVO mode operating range 308A bordering the SI operating range and a second PVO mode operating range 308B bordering the NVO mode operating range 306. The first PVO mode operating range 308A is referred to as an upper PVO mode operating range 308A and the second PVO mode operating range 308B is referred to as lower PVO mode operating range 308B with respect to the relative torque output of the operating ranges.

The LTC engine 102 coupled with the 3-way and SCR catalysts system of the present disclosure has unique characteristics that enable a refined tip-out enrichment strategy when transitioning from the SI mode operating range 310 to one of the upper and lower PVO mode operating ranges 308A, 308B. The refined tip-out enrichment strategy includes a first enrichment A/F ratio profile when the LTC engine 102 transitions from the SI mode 310 to operating in the first (upper) PVO mode operating range 308A and a second enrichment A/F ratio profile when the LTC engine 102 transitions from the SI mode 310 to operating in the second (lower) PVO mode operating range 308B.

Figure 4:
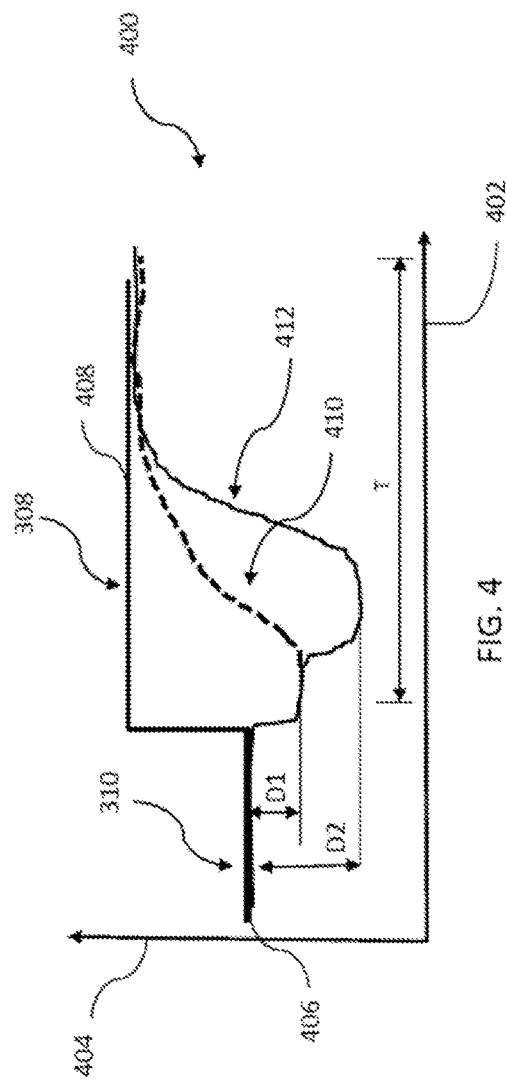
FIG. 4 is a graph illustrating example Air/Fuel (A/F) ratios as a LTC engine transitions into the PVO mode from one of a spark ignition (SI) mode and NVO mode according to the present disclosure.

FIG. 4 shows a graph 400 illustrating an example of the first enrichment A/F ratio profile 410, also referred to as a shallow enrichment PVO mode 410, and an example the second enrichment A/F ratio profile 412, also referred to as a deep enrichment PVO mode 412, as the LTC engine 102 transitions from SI mode 310 to the PVO mode 308 during a tip-out event. The horizontal x-axis 402 that represents time and the vertical y-axis 404 that represents A/F ratio.

In the graph 400, the shallow enrichment A/F ratio profile 410 is shown with a dashed-line and the deep enrichment A/F ratio profile 412 is shown with a solid-line. The shallow enrichment A/F ratio profile 410 shows the change of the desired A/F ratio with respect to time as the LTC engine 102 transitions from operating at the SI mode 310 to operating in the first PVO mode 308A. The deep enrichment A/F ratio profile 412 shows the change of the desired A/F ratio with respect to time as the LTC engine 102 transitions from operating at the SI mode 310, passing through the first PVO mode 308A, to operating in the second PVO mode 308B.

Referring to the shallow enrichment mode 410, the A/F ratio of the LTC engine 102 is adjusted from a first A/F ratio 406 to a maximum depth D1 before rising to a second A/F ratio 408 over the period T. The depth D1 is measured from the initial A/F ratio 406, when the LTC engine 102 is in SI mode, to the bottom of the shallow enrichment A/F ratio profile 410. It is preferable that the A/F ratio at D1 is approximately from about 13:1 to 14:1, preferably closer to about 13:1. The term "about" means +/−5% of the stated numerical value. The shallow enrichment mode 410 is completed, or expired, once the A/F ratio reaches the second A/F ratio 408.

Referring to the deep enrichment mode 412, the A/F ratio of the LTC engine 102 is adjusted from the first A/F ratio 406 to a maximum depth D2 before rising to the second A/F ratio 408 over the period T. The depth D2 is measured from the initial A/F ratio 406, when the LTC engine 102 is in SI mode, to the bottom of the shallow enrichment A/F ratio profile 410. It is preferable that the A/F ratio at D2 is approximately from about 11:1 to 12:1, preferably closer to about 12:1. The deep enrichment mode 412 is completed, or expired, once the A/F ratio reaches the second A/F ratio 408.

Figure 5:
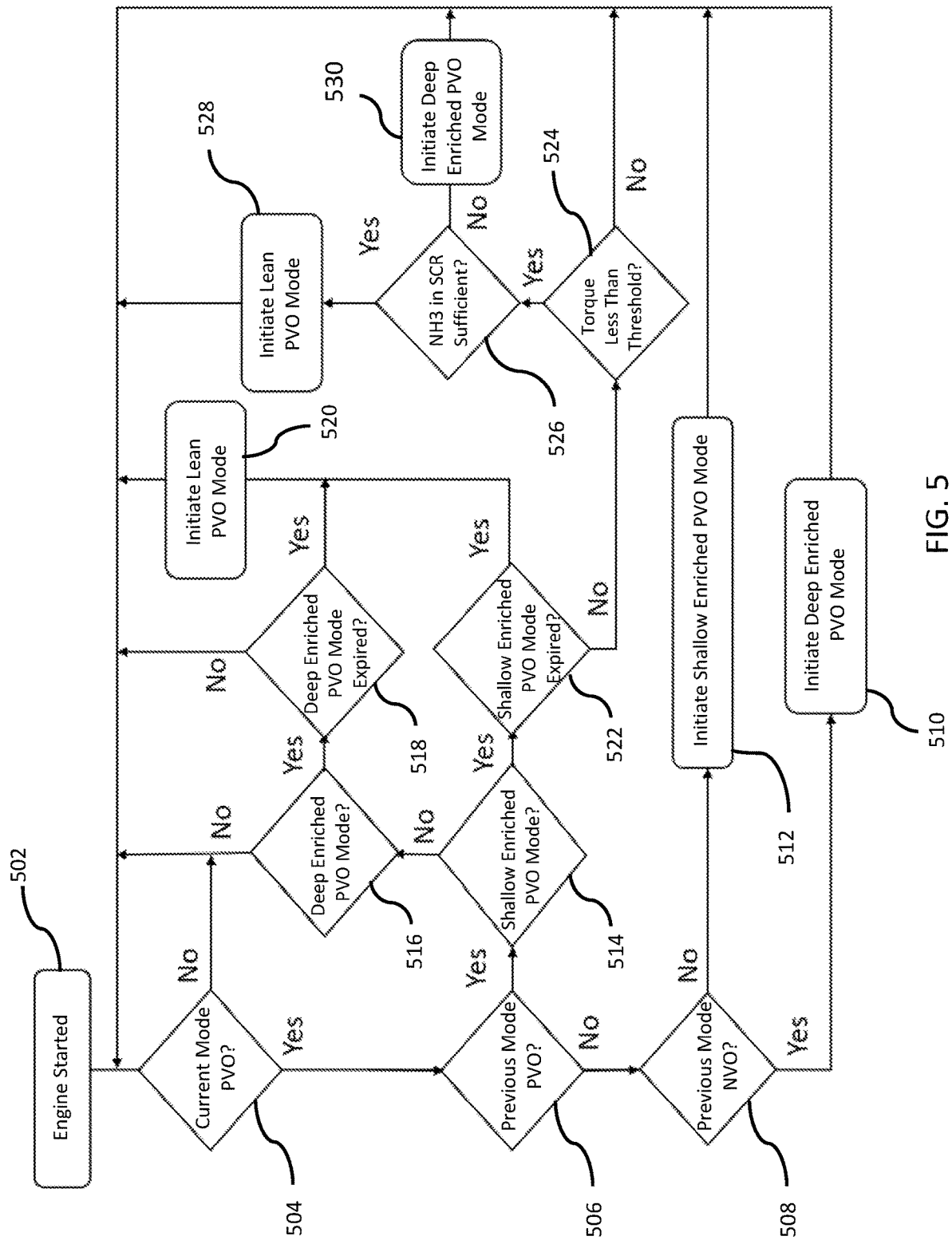
FIG. 5 is a flowchart illustrating a method of transient control for robust enrichment operation of a LTC engine when the LTC transitioning into the PVO mode.

FIG. 5 shows a block flowchart of a method of transient control for robust tip-out enrichment operation as the LTC engine 102 transitions from a SI mode operating range 310 to a PVO mode operating range 308 (herein referred to as the "Method 500"). The method 500 is implemented by the ECM 114 shown in FIG. 2 for controlling the engine system 100 shown in FIG. 1. The Method 500 may call for a particular module to perform a step, however, it is not meant to be so limited and should be appreciated that other modules within the ECM 114 may also be configured to perform the step. Furthermore, it should be appreciated that a particular module called for to perform a step of the method 500 may be located apart from the ECM 114. Still furthermore, any steps implemented by the modules 202, 204, 206, 208, 210, 212, 214, 216, or 218 may be referred to as steps implemented by the ECM 114.

Referring to FIG. 5, the method 500 begins in block 502 after a LTC engine 102 is started and operating. Moving to block 504, the combustion mode module 208 of the ECM 114 determines if the LTC engine 102 is currently operating in PVO mode based a predetermined relationship between a PVO mode operating range and the engine speed and load. Referring back to FIG. 3, graph 300 presents a predetermined operating range relationships between NVO mode 306, PVO mode 308, and Stoich SI mode 310. If the LTC engine 102 is not currently operating in PVO mode, then the method 500 returns to block 504. If the If the LTC engine 102 is currently operating in PVO mode, then the method 500 continues to block 506.

Moving to block 506, the combustion mode module 208 determines if the previous mode of the LTC engine 102 was also in a PVO mode 308. The previous mode meaning the operating mode immediately prior to transitioning to the current operating mode. If the previous operating mode was not in a PVO mode, then the method 500 moves to block 508.

Moving to block 508 from block 506, the combustion mode module 208 of the ECM 114 determines if the previous mode of the LTC engine 102 was in a NVO mode 306. If the previous operating mode was in a NVO mode 306, then the method 500 moves to block 510, where the ECM 114 initiates a deep enrichment PVO mode 412 as shown in FIG. 4 and the method 500 returns to block 504. If the previous operating mode was not in a NVO mode 306, then the method 500 moves to block 512 where the ECM 114 initiates a shallow enrichment PVO mode 410 and the method 500 returns to block 504.

Referring back to block 506, if the previous operating mode was in a PVO mode 308, then the method 500 moves to block 514. In block 514, the ECM 114 determines if the LTC engine 102 is operating in the shallow enrichment PVO mode 410. If the LTC engine 102 is not operating in the shallow enrichment PVO mode 410, then the method moves to block 516.

In block 516, the ECM 114 determines if the LTC engine 102 is operating in the deep enrichment PVO mode 412. If the LTC engine 102 is not operating in deep enrichment PVO mode 412 then the method returns to block 504. If the LTC engine 102 is operating in a deep enrichment PVO mode 412, then the method moves to block 518. In block 518, the ECM 114 determines if the deep enrichment PVO mode 412 is expired or completed. If the deep enrichment PVO mode has not expired, then the method 500 returns to block 504. If the deep enrichment PVO mode is expired, then the method 500 moves to block 520 where the ECM 114 initiate a lean PVO mode 308 and the method 500 returns to block 504.

Referring back to block 514, if the LTC engine 102 is operating in shallow enrichment PVO mode 410, then the method moves to block 522. In block 522, the ECM 114 determines if the shallow enrich PVO mode 410 is expired or completed. If the shallow enrichment PVO mode 410 is expired then the method moves to block 520 where the ECM 112 initiate a lean PVO mode 308 and the method 500 returns to block 504.

Referring back to block 522, if the shallow enrichment PVO mode 410 has not expired (i.e. completed) then the method moves to block 524 where the ECM 114 determines if the engine torque output is less than a predetermined threshold. If the engine torque output is not less than a predetermine threshold, then the method returns to block 504. If the engine torque output is less than a predetermine threshold, then the method 500 moves to block 526.

In block 526, the ECM 114 determines if the $NH_3$ in the SCR is sufficient for the reduction of NOx to $NH_2$ in the SCR. If the $NH_3$ in the SCR is sufficient then the method moves to block 528 where the ECM 114 initiates a lean PVO mode 308. If the $NH_3$ in the SCR is not sufficient then the method moves to block 530 where the ECM 114 initiates a deep enrichment PVO mode 412 and the method returns to block 504.

The description of the present disclosure is merely exemplary in nature and variations that do not depart from the general sense of the present disclosure are intended to be within the scope of the present disclosure. Such variations are not to be regarded as a departure from the spirit and scope of the present disclosure.

The invention claimed is:

1. A method of transient control for enrichment operation in a low-temperature combustion (LTC) engine, comprising:
   detecting, by an engine control module (ECM), a tip-out request;
   determining, by the ECM, that a current mode of the LTC engine is a positive valve overlap (PVO) mode, in response to the detected tip-out request;
   determining, by the ECM, that a previous mode of the LTC engine was not the PVO mode in response to the current mode of the LTC engine is determined the PVO mode;
   determining, by the ECM, that the previous mode of the LTC engine was not a negative valve overlap (NVO) mode in response to the previous mode of the LTC engine is determined not the PVO mode; and
   initiating a shallow enrichment PVO mode by forming an air/fuel ratio richer than a stochiometric air/fuel ratio by injecting fuel into at least one of an intake manifold and a cylinder to form the air/fuel ratio richer than the stochiometric air/fuel ratio.

2. The method of claim 1, wherein the shallow enrichment PVO mode includes an air/fuel ratio of from about 13:1 to about 14:1.

3. The method of claim 1, wherein the shallow enrichment PVO mode includes an air/fuel ratio of about 13:1.

4. A low-temperature combustion (LTC) engine system comprising:
an engine control module (ECM) comprising:
a combustion mode module configured to switch a combustion mode of an LTC engine between a positive valve overlap (PVO) mode and a negative valve overlap (NVO) mode;
a valve control module configured to:
control an intake valve and an exhaust valve of a cylinder of the LTC engine to yield a positive valve overlap when the LTC engine is operating in the PVO mode; and
control the intake valve and the exhaust valve of the cylinder to yield a negative valve overlap when the LTC engine is operating in the NVO mode;
an air/fuel (A/F) ratio control module configured to adjust a desired air/fuel ratio of the LTC engine to (i) a shallow enrichment PVO mode and (ii) a deep enrichment PVO mode adjusting the air/fuel ratio richer than the stochiometric air/fuel ratio; and
a fuel actuator module configured to regulate a fuel injection to inject fuel into at least one of an intake manifold and the cylinder to achieve the desired air/fuel ratio; and
wherein the ECM is configured to:
determine a current mode of the LTC engine is the PVO mode;
determine a previous mode of the LTC engine was one of: (i) the PVO mode and (ii) not the PVO mode, in response to the current mode is determined the PVO mode;
determine the previous mode of the LTC engine was one of: the NVO mode and not the NVO mode, in response to the previous mode was determined not the PVO mode; and
initiate the deep enrichment PVO mode for the LTC engine in response to the previous mode of the LTC engine is determined the NVO mode and initiate the shallow enrichment PVO mode in response to the previous mode of the LTC engine is determined not the NVO mode.

5. The LTC engine system of claim 4, wherein the ECM is further configured to:
determine whether the LTC engine is currently operating in the shallow enrichment PVO mode, in response to the previous mode was determined the PVO mode;
determine whether the shallow enrichment PVO mode is expired or the shallow enrichment PVO mode is not expired, in response to the LTC engine is determined currently operating in the shallow enrichment PVO mode; and
initiate a lean PVO mode for the LTC engine in response to the shallow enrichment PVO mode is determined to be expired.

6. The LTC engine system of claim 5, further comprising a selective catalytic reduction (SCR) catalyst, and wherein the ECM is further configured to:
determine a torque output of the LTC engine is below a predetermined threshold, in response to the shallow enrichment PVO mode is determined not expired;
determine whether an amount of $NH_3$ in the SCR catalyst is one of: greater than a predetermined amount and not greater than the predetermined amount; and
initiate the lean PVO mode for the LTC engine, when the torque output of the LTC engine is determined below the predetermined threshold and the determined amount of $NH_3$ in the SCR catalyst is greater than the predetermined amount.

7. The LTC engine system of claim 6, wherein the ECM is further configured to initiate the deep enrichment PVO mode in response to the torque output of the LTC engine is determined below the predetermined threshold and the determined amount of $NH_3$ in the SCR catalyst is not greater than the predetermined amount.

8. The LTC engine system of claim 5, wherein the ECM is further configured to:
determine the LTC engine is currently not operating in the shallow enrichment PVO mode, in response to the previous mode was determined the PVO mode;
determine that the LTC engine is currently operating in the deep enrichment PVO mode, in response to the LTC engine is not currently operating in the shallow enrichment PVO mode;
determine that the deep enrichment PVO mode is expired in response to the LTC engine is determined currently operating in the deep enrichment PVO mode; and
initiate the lean PVO mode for the LTC engine in response to the deep enrichment PVO mode is determined expired.

9. The LTC engine system of claim 4, wherein the deep enrichment PVO mode includes an air/fuel ratio of from about 11:1 to about 12:1.

10. The LTC engine system of claim 4, wherein the deep enrichment PVO mode includes an air/fuel ratio of about 12:1.

11. The LTC engine system of claim 4, wherein the shallow enrichment PVO mode includes an air/fuel ratio of from about 13:1 to about 14:1.

12. The LTC engine system of claim 4, wherein the shallow enrichment PVO mode includes an air/fuel ratio of about 13:1.

13. The LTC engine system of claim 4, wherein the ECM is further configured to:
detect a tip-out request; and
determine the current mode of the LTC engine after the tip-out request is detected.

14. A low-temperature combustion (LTC) engine system comprising:
an engine control module (ECM) comprising:
a combustion mode module configured to switch a combustion mode of an LTC engine between a positive valve overlap (PVO) mode and a negative valve overlap (NVO) mode;
a valve control module configured to:
control an intake valve and an exhaust valve of a cylinder of the LTC engine to yield a positive valve overlap when the LTC engine is operating in the PVO mode; and
control the intake valve and the exhaust valve of the cylinder to yield a negative valve overlap when the LTC engine is operating in the NVO mode;
an air/fuel (A/F) ratio control module configured to adjust a desired air/fuel ratio of the LTC engine to (i) a shallow enrichment PVO mode and (ii) a deep enrichment PVO mode by adjusting the desired air/fuel ratio richer than the stochiometric air/fuel ratio; and
a fuel actuator module configured to regulate fuel injections to inject fuel into at least one of an intake manifold and the cylinder to achieve the desired air/fuel ratio; and wherein the ECM is configured to:
  determine a current mode of the LTC engine is the PVO mode;
  determine a previous mode of the LTC engine was one of: (i) the PVO mode and (ii) not the PVO mode, when the current mode is the PVO mode;
  determine the previous mode of the LTC engine was one of: the NVO mode and not the NVO mode, when the previous mode was not the PVO mode; and
  initiate a predetermined enrichment PVO mode for the LTC engine based on whether the previous mode of the LTC engine was the NVO mode or not the NVO mode;
  determine whether the LTC engine is currently operating in the shallow enrichment PVO mode, when the previous mode was the PVO mode;
  determine whether the shallow enrichment PVO mode is expired or the shallow enrichment PVO mode is not expired, when the LTC engine is currently operating in the shallow enrichment PVO mode; and
  initiate a lean PVO mode for the LTC engine when the shallow enrichment PVO mode is expired; and
a selective catalytic reduction (SCR) catalyst; and
wherein the ECM is further configured to:
  determine a torque output of the LTC engine is below a predetermined threshold, when the shallow enrichment PVO mode is not expired;
  determine whether an amount of $NH_3$ in the SCR catalyst is one of: greater than a predetermined amount and not greater than the predetermined amount; and
  initiate the lean PVO mode for the LTC engine, when the torque output of the LTC engine is below the predetermined threshold and the determined amount of $NH_3$ in the SCR catalyst is greater than the predetermined amount.

15. The LTC engine system of claim 14, wherein the ECM is further configured to initiate the deep enrichment PVO mode when the torque output of the LTC engine is below the predetermined threshold and the determined amount of $NH_3$ in the SCR catalyst is not greater than the predetermined amount.

16. The LTC engine system of claim 14, wherein the deep enrichment PVO mode includes an air/fuel ratio of from about 11:1 to about 12:1.

17. The LTC engine system of claim 14, wherein the deep enrichment PVO mode includes an air/fuel ratio of about 12:1.

18. The LTC engine system of claim 14, wherein the shallow enrichment PVO mode includes an air/fuel ratio of from about 13:1 to about 14:1.

19. The LTC engine system of claim 14, wherein the shallow enrichment PVO mode includes an air/fuel ratio of about 13:1.

20. The LTC engine system of claim 14, wherein the ECM is further configured to:
  detect a tip-out request; and
  determine the current mode of the LTC engine in response to detecting the tip-out request.

\* \* \* \* \*